United States Patent
Davis et al.

[11] 3,893,291
[45] July 8, 1975

[54] GAS TURBINE FUEL CONTROL

[75] Inventors: James L. Davis; Edward L. Lopke, both of Kokomo; Leslie Joseph Pechous, Carmel, all of Ind.

[73] Assignee: General Motors Corporation, Detroit, Mich.

[22] Filed: Aug. 29, 1973

[21] Appl. No.: 392,739

[52] U.S. Cl. .......................................... 60/39.28 T
[51] Int. Cl. .............................................. F02c 9/08
[58] Field of Search ................ 60/39.28 R, 39.28 T

[56] References Cited
UNITED STATES PATENTS

| | | | |
|---|---|---|---|
| 2,830,437 | 4/1958 | Woodward | 60/39.28 T |
| 2,835,450 | 5/1958 | Brown | 60/39.28 T |
| 3,098,356 | 7/1963 | Joline | 60/39.28 T |
| 3,691,405 | 9/1972 | Kendell | 60/39.28 T |
| 3,747,340 | 7/1973 | Fenton | 60/39.28 T |
| 3,774,395 | 12/1973 | Greune | 60/39.28 T |

Primary Examiner—Clarence R. Gordon
Attorney, Agent, or Firm—Paul Fitzpatrick

[57] ABSTRACT

An electrical fuel control system for a gas turbine engine balances a turbine inlet temperature signal against an allowable turbine inlet temperature signal as means for limiting fuel flow to the engine during acceleration. The turbine temperature signal is generated by a thermocouple which has time lag. This signal is compensated for the time lag and for other parameters to improve engine response by a compensating circuit including an operational amplifier. The amplifier has an integrating feedback to compensate for thermocouple lag and it has a differentiating input of a fuel flow signal to provide damping. It has also a feedback of engine acceleration which reduces the temperature compensation to allow for increased fuel flow in anticipation of increased airflow resulting from the acceleration.

6 Claims, 1 Drawing Figure

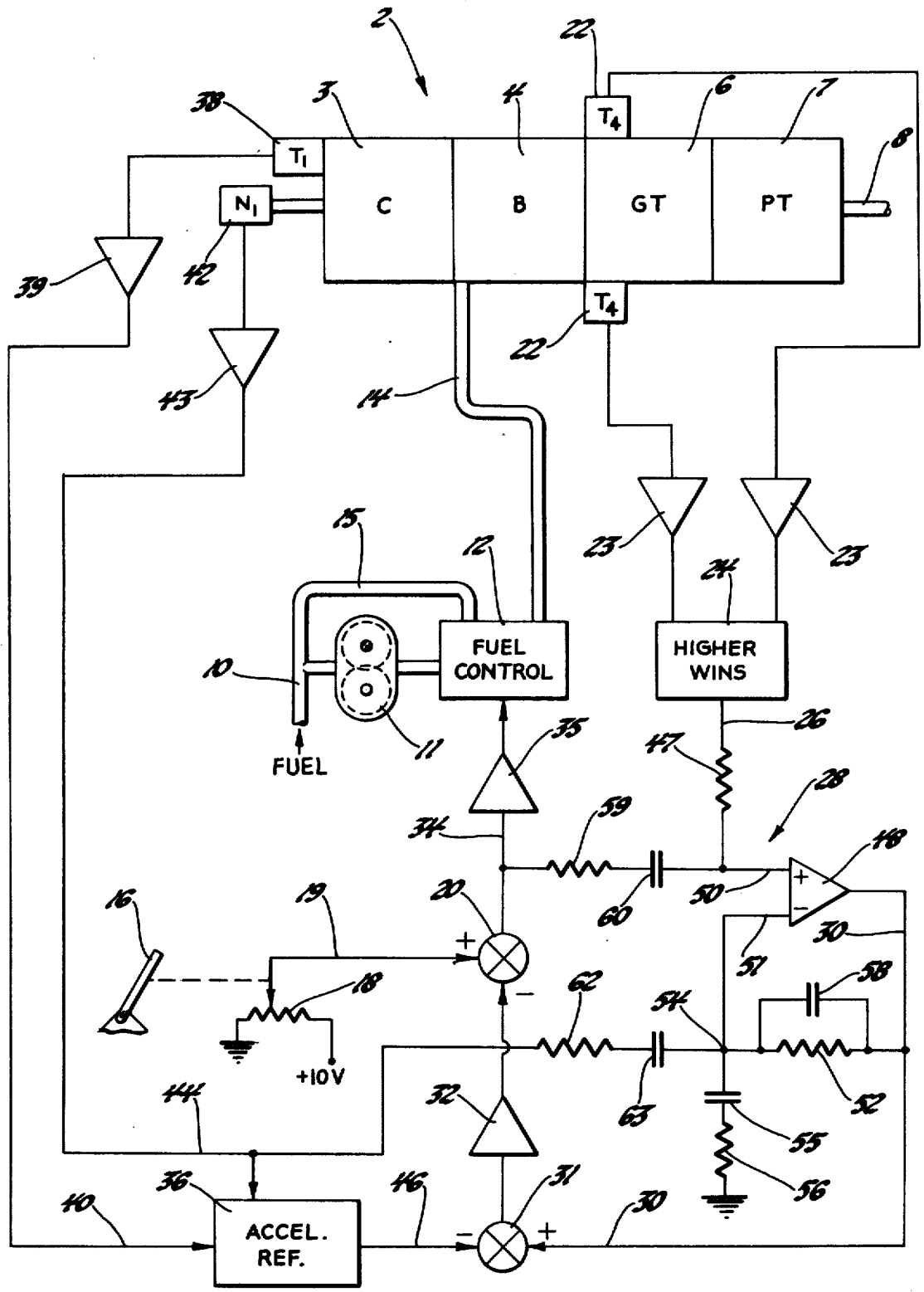

GAS TURBINE FUEL CONTROL

Our invention relates to fuel controls for gas turbine engines, and particularly to means for compensating or adjusting an engine temperature signal to cause fuel flow during acceleration to accord quite closely with the characteristics of the engine to provide maximum acceleration with safe and proper operation of the engine.

Our invention is embodied in a system in which a transducer or transducers generate a signal indicative of temperature of these transducers which are exposed to motive fluid passing through a turbine. Fuel flow to the engine is controlled by the signal from these transducers acting in opposition to a signal indicative of maximum allowable turbine temperature under the particular instantaneous conditions of engine operation and ambient temperature.

More specifically, our invention is embodied in what we term a compensating circuit which is connected effectively between the means generating the desired turbine temperature limit and the transducer means generating a turbine actual temperature signal. Our circuit may be most conveniently thought of as means for compensating the output of a temperature transducer such as a thermocouple, and is so shown. However, it could alternatively be regarded as means for compensating or trimming the allowable limit temperature rather than as part of the feedback.

It its preferred embodiment our invention embodies an operational amplifier including circuits which compensate for the inherent lag of thermocouples. It also includes inputs of rate of change of fuel flow to the engine and of rate of change of engine speed; that is, gas generator acceleration. The fuel flow signal tends to increase the initial thermocouple signal during acceleration and the acceleration input subtracts from the initial measured temperature. Thus, the compensating circuit as a whole modifies the initial measured temperature (1) to compensate, in some measure at least, for thermocouple lag (2) as a function of rate of change of fuel flow to stabilize the control system and (3) as a function of engine acceleration to anticipate change in airflow which, for any given fuel flow, will change the temperature of the turbine motive fluid.

The nature of our invention and its advantages will be apparent to those skilled in the art from the succeeding detailed description of the preferred embodiment of the invention and the accompanying drawing.

The FIGURE is a schematic diagram of a gas turbine control system embodying the invention.

GENERAL DESCRIPTION OF THE POWER PLANT

The power plant illustrated schematically in the FIGURE comprises a gas turbine engine 2 of the gas-coupled type including a compressor 3 which draws in atmospheric air and delivers it at higher pressure, a burner or combustion apparatus 4 which receives the discharge from the compressor, and a gas generator turbine 6 which is driven by the combustion products from burner 4, and which is connected to drive the compressor 3. These elements constitute a gas generator which delivers partly expanded combustion products to a power turbine 7 which drives a power output shaft 8. Fuel for the engine is delivered from any suitable source through a low pressure fuel line 10, a pump 11 which may be driven by the gas generator, a fuel control 12, and a fuel line 14 to the burner, where it is ignited by means not illustrated. The fuel control meters the fuel supplied to the engine and returns excess pump discharge to the pump inlet through a by-pass line 15.

The fuel control 12 is of a type which operates to meter fuel in response to the magnitude of an electrical signal. One such device is described in Carothers U.S. Pat. No. 3,732,039, May 8, 1973. The electrical signal, as indicated on the schematic diagram, is generated in part by an operator control such as the accelerator pedal 16 of a vehicle which transmits a potential signal indicative of the desired engine power level, which may be expressed as the turbine inlet temperature. The pedal 16 operates some position transducer which provides a potential signal indicative of the requested temperature or power level. As illustrated in the FIGURE, this is accomplished by a connection from the accelerator pedal to the movable tap of a potentiometer 18 connected between a closely regulated plus 10 volt supply and ground. The position of the potentiometer tap determines the potential supplied through a lead 19 to an algebraic summing device 20. The signal indicative of desired engine temperature is a positive input and a signal representative of actual engine temperature is a negative input to device 20. This temperature signal originates with preferably two thermocouples or equivalent temperature measuring devices 22, the symbol $T_4$ indicating gas generator turbine inlet temperature.

The details of thermocouple circuits as such are immaterial to our present invention. In a general way, it may be pointed out that each thermocouple 22 is connected through an amplifier 23 and a higher wins gate 24 to a measured temperature lead 26, the potential on which represents the value of turbine inlet temperature which is measured by the thermocouples. The specific thermocouple and amplifier circuits which are preferred for use with the present invention are disclosed in our U.S. Pat. No. 3,821,562 for Thermocouple Amplifier. Our invention is particularly concerned with a compensating circuit 28 which modifies the measured temperature signal and delivers a compensated temperature signal on an output lead 30. The compensated temperature signal on line 30 is fed through an algebraic summing device 31 and amplifier 32 to the subtractive input of summing device 20. The output, which is positive only as long as the temperature request signal on line 19 is higher than the temperature output signal of amplifier 32, is fed through a fuel control signal line 34 and an amplifier 35 to the fuel control.

Before describing the compensating circuit, we will mention the acceleration reference circuit which provides a signal of maximum allowable turbine temperature which also is fed into the algebraic summing device 31. The details of the acceleration reference circuit are not material to the present invention. The preferred acceleration reference system is described in our U.S. patent application Ser. No. 392,738 filed Aug. 29, 1973 for Gas Turbine Fuel Control. Briefly, the acceleration reference circuit comprises an acceleration reference computing circuit 36 which receives inputs of engine inlet temperature and gas generator speed and delivers an output potential which is proportional to the allowable limit of turbine temperature under the existing conditions. Engine inlet temperature $T_1$, which may be essentially the same as ambient atmospheric temperature, is measured by a transducer 38 adjacent the engine inlet which provides a signal to the acceleration reference circuit through amplifier 39 and a lead 40. The gas generator speed is measured by an $N_1$ transducer 42 driven by the gas generator which provides an electrical output through an amplifier 43 and a lead 44 to the acceleration reference circuit. Based upon these inputs, the acceleration reference circuit delivers a potential on its output line 46 representing allowable turbine temperature which is subtracted from the compensated temperature signal in the algebraic summing device 31.

It will be seen from the foregoing that the function of the compensating circuit 28 is to trim or adjust the measured temperature signal so that it accurately represents existing and imminently impending conditions in the engine during transients such as acceleration so that the comparison of the computed limit temperature with the actual temperature will result in controlling fuel to the engine so that acceleration will be both safe and as rapid as possible.

TEMPERATURE SIGNAL COMPENSATING CIRCUIT

The preferred embodiment of this circuit will now be described in detail, and to provide a complete and enabling disclosure, components will be identified and values of components will be specified. It is to be understood, however, that the values are merely those now preferred and that changes may be made to suit different installations and as a result of changes in available components and advances in the electronic art.

The measured temperature lead 26 provides the input of measured temperature to the compensating circuit 28 through an input resistor 47 (68 kilohm). Resistor 47 is connected to the non-inverting or plus input terminal 50 of operational amplifier 48. This amplifier may be any suitable operational amplifier; specifically, the one employed is one side of a dual operational amplifier sold by Signetics Corporation of Sunnyvale, California under No. S5558V. The output terminal of the amplifier is connected to the output lead 30 previously referred to. The feedback from this lead to the inverting input terminal 51 of the operational amplifier is provided through a resistor 52 (68 kilohm) by way of a junction 54. Junction 54 is grounded through a capacitor 55 (22 mfd) and resistor 56 (3 kilohm) in series. Resistor 52 and capacitor 55 constitute an RC circuit to provide an integrating feedback to the operational amplifier which subtracts from the feedback signal during increasing transients, and thus causes the output on line 30 to increase. Resistor 56 is provided to limit the gain of the amplifier at high frequencies to a maximum of approximately 27 db. A small capacitor 58 (0.3 mfd) shunting resistor 52 acts as a noise filter to transmit stray alternating currents which may be present in the circuit.

The reason for the compensation effected by the integrating circuit of resistor 52 and capacitor 55 lies in the characteristics of thermocouples and presumably other temperature measuring devices. The thermocouple responds to the temperature of the gas passing by on its way into, through, or from the turbine and generates a potential which is accurately proportional to temperature during steady state operation. However, when there is a change in temperature, the metal of the thermocouple junction requires time to heat and thus its output lags the actual temperature. With a step change in temperature, the output of the thermocouple follows an exponential curve approaching the actual temperature asymptotically. Thus, for example, if the engine is given an increase in fuel and is accelerating, the temperature measured by the thermocouple will lag the actual gas temperature and the reading of the thermocouple will be lower than the actual gas temperature so that, unless some compensation is applied, there is a tendency for the engine temperature to overshoot the desired limit. This fact has long been recognized and Vickers U.S. Pat. No. 2,755,999, July 24, 1956, is directed to a circuit for compensating a thermocouple output for the time constant of the thermocouple. Our present circuit does not include a rate of gas flow factor in the time correction, but is set for an average time constant. This is adequate and avoids complication. The time constant can be adjusted for a particular application by varying the capacity of capacitor 55 on the basis of tests of engine operation.

An additional input to the operational amplifier 48 is provided from the fuel control signal line 34 which carries a potential which determines engine fuel flow. This line is connected through a differentiating RC circuit comprising resistor 59 (220 kilohm) and capacitor 60 (10 mfd) to the non-inverting input terminal 50 of the operational amplifier. The result is to mix a signal indicative of rate of change of fuel flow with the measured temperature signal fed through resistor 47. When a transient in fuel flow is ordered by change of potential on line 34, this is transmitted to the input 50 and the input then decays as the capacitor 60 is charged or discharged. This input tends to increase the output on line 30 with increasing transients in fuel supply, and thus this acts as a negative feedback and has a stabilizing effect on the control tending to prevent overshoots.

The remaining input to the compensating circuit is an engine speed signal from line 44, previously mentioned, through a differentiating RC circuit to junction 54 and thus to the inverting input 51 of the operational amplifier. The differentiating circuit comprises a resistor 62 and a capacitor 63 connected in series. The result is that an increase in engine speed provides a potential which is mixed with that supplied to junction 54 by the thermocouple lag compensating portion of the circuit. The increment is proportional to the rate of change of speed of the gas generator or, in other words, to the acceleration of the gas generator. For positive acceleration, this input acts to decrease the temperature signal on line 30, thus allowing more fuel to flow to the engine than would flow in the absence of this compensation. The reason for the compensation responsive to engine acceleration is that such acceleration increases airflow and thus calls for a greater quantity of fuel for the same turbine temperature.

Thus, to sum it up, the temperature measured by the thermocouples is increased for an increasing temperature signal and decreased for a decreasing temperature signal by the RC circuit 52, 55 to compensate for thermocouple time lag. The signal is increased by the RC circuit 59, 60 for increasing fuel flow and decreased for decreasing fuel flow as a stabilizing input. The temperature signal is decreased for positive engine acceleration and increased for negative acceleration as an anticipating measure to respond to the change in airflow. The presence of the operational amplifier results in accurate and predictable compensation in response to these three inputs of measured temperature, fuel flow, and engine speed.

It may be pointed out that resistors 47 and 52 are selected to be of the same value to balance the inputs 50 and 51 of the operational amplifier 48.

It will be apparent to those skilled in the art from the foregoing description that we have provided a system which responds very favorably to transients in engine operation to provide a temperature signal indicative of the conditions which will occur in the engine when the fuel is corrected in accordance with the signal.

We have illustrated the control input 16 as controlling engine temperature, with a temperature feedback. It could, of course, directly control gas generator speed against a speed feedback. In this case, the temperature control system disclosed herein could serve as an override or limiter on the fuel control.

The detailed description of the preferred embodiment of the invention for the purpose of explaining the principles thereof is not to be considered as limiting or restricting the invention, since many modifications may be made by the exercise of skill in the art.

We claim:

1. A system for controlling fuel flow to a gas turbine engine comprising, in combination, means responsive to a temperature in the engine effective to generate a potential signal representative of the instantaneous temperature of the responsive means and compensating means for the said signal, the compensating means comprising means for adding a function of the derivative of the signal, means for adding a function of the derivative of fuel flow to the engine, and means for subtracting a function of acceleration of the engine; the compensating means including an operational amplifier with a non-inverting input receiving the first signal and a fuel flow derivative signal, and with an inverting input receiving an integrated signal from the amplifier output and an acceleration signal.

2. A system for controlling fuel flow to a gas turbine engine comprising, in combination, means responsive to a temperature in the engine effective to generate a first potential signal representative of the instantaneous temperature of the responsive means, means effective to generate a second potential signal representative of a control value of the said engine temperature, and fuel control means responsive to the said signals, characterized by the combination therewith of compensating means for the first signal, the compensating means comprising means for adding a function of the derivative of the first signal, means for adding a function of the derivative of fuel flow to the engine, and means for subtracting a function of acceleration of the engine; the compensating means including an operational amplifier with a non-inverting input receiving the first signal and a fuel flow derivative signal, and with an inverting input receiving an integrated signal from the amplifier output and an acceleration signal.

3. A system for controlling fuel flow to a gas turbine engine comprising, in combination, means responsive to a temperature in the engine effective to generate a potential signal representative of the instantaneous temperature of the responsive means and compensating means for the said signal, the compensating means comprising an operational amplifier having a non-inverting input, an inverting input, and an output; means including a first resistor for transmitting the first signal to the non-inverting input; means generating a potential representative of engine fuel flow; a differentiating RC circuit connecting the last-named means to the non-inverting input; a second resistor equal in resistance to the first resistor connecting the output to the inverting input; an integrating capacitor connected to the inverting input and a resistor of relatively small resistance connecting the capacitor to ground; means generating a potential representative of engine speed and a differentiating RC circuit connecting the last-named means to the inverting input; the amplifier output delivering the compensated temperature signal.

4. A system for controlling fuel flow to a gas turbine engine comprising, in combination, means responsive to a temperature in the engine effective to generate a first potential signal representative of the instantaneous temperature of the responsive means, means effective to generate a second potential signal representative of a control value of the said engine temperature, and fuel control means responsive to the said signals, characterized by the combination therewith of compensating means for the first signal, the compensating means comprising an operational amplifier having a non-inverting input, an inverting input, and an output; means including a first resistor for transmitting the first signal to the non-inverting input; means generating a potential representative of engine fuel flow; a differentiating RC circuit connecting the last-named means to the non-inverting input; a second resistor equal in resistance to the first resistor connecting the output to the inverting input; an integrating capacitor connected to the inverting input and a resistor of relatively small resistance connecting the capacitor to ground; means generating a potential representative of engine speed and a differentiating RC circuit connecting the last-named means to the inverting input; the amplifier output delivering the compensated temperature signal.

5. A system for controlling fuel flow to a gas turbine engine comprising, in combination, means responsive to a temperature in the engine effective to generate a first potential signal representative of the instantaneous temperature of the responsive means and compensating means for the said signal effective to provide a compensated temperature signal, the compensating means comprising means for adding a function of the derivative of the first signal of the same sign as the derivative of the first signal, means for adding a function of the derivative of the rate of fuel flow to the engine of the same sign as the derivative of fuel flow rate, and means for subtracting a function of acceleration of the engine of the same sign as the acceleration.

6. A system for controlling fuel flow to a gas turbine engine comprising, in combination, means responsive to a temperature in the engine effective to generate a first potential signal representative of the instantaneous temperature of the responsive means, means effective to generate a second potential signal representative of a control value of the said engine temperature, and fuel control means responsive to the said signals, characterized by the combination therewith of compensating means for the first signal effective to provide a compensated temperature signal, the compensating means comprising means for adding a function of the derivative of the first signal of the same sign as the derivative of the first signal, means for adding a function of the derivative of the rate of fuel flow to the engine of the same sign as the derivative of fuel flow rate, and means for subtracting a function of acceleration of the engine of the same sign as the acceleration.

* * * * *